United States Patent [19]
Bement et al.

[11] 3,712,575
[45] Jan. 23, 1973

[54] CAVITY MOLD WITH SELECTIVELY POSITIONED RESILIENT WALL PORTIONS

[75] Inventors: Ronald Allan Bement, Northglenn; Augustus Boyd Brown, Longmont, both of Colo.

[73] Assignee: International Business Machines Corporation, Armonk, N.Y.

[22] Filed: Nov. 6, 1970

[21] Appl. No.: 87,509

[52] U.S. Cl. .....................249/91, 264/272, 264/275
[51] Int. Cl. ..............................................B22d 19/00
[58] Field of Search..........249/83, 91, 95, 96; 18/1 D, 18/5 E, 30 UM, 34 R, 36, 42 R, DIG. 7, DIG. 10, DIG. 24; 264/271, 272, 275, 276, 277; 174/68.5

[56] References Cited

UNITED STATES PATENTS

| | | | |
|---|---|---|---|
| 3,045,290 | 7/1962 | Anderson et al. | 264/272 X |
| 3,542,328 | 11/1970 | Deitrick | 249/95 |
| 3,012,273 | 12/1961 | Lewis | 18/5 E |

*Primary Examiner*—J. Spencer Overholser
*Assistant Examiner*—Lucius R. Frye
*Attorney*—Hanifin and Jancin and Francis A. Sirr

[57] ABSTRACT

A magnetic recording head is molded by positioning a number of ceramic cards, each of which carries electronic components and head gaps, in a metallic cavity mold. The mold includes selectively placed rubber inserts. These inserts are located such that an insert engages the ceramic cards at the area of the head gap, and such that inserts engage the cards in the vicinity of the electronic components to effectively place these components outside the mold cavity. The subsequent injection of a plastic molding compound into the mold cavity selectively encapsulates the cards, leaving the head gap area and the electronic components free of molding compound.

3 Claims, 3 Drawing Figures

PATENTED JAN 23 1973

INVENTORS
RONALD A BEMENT
AUGUSTUS E BROWN

BY
ATTORNEY

CAVITY MOLD WITH SELECTIVELY POSITIONED RESILIENT WALL PORTIONS

BACKGROUND AND SUMMARY OF THE INVENTION

Prior art cavity molds are known wherein the mold cavity includes a resilient flexible liner functioning, for example, to facilitate the removal of the molded part.

The present invention relates to a cavity mold for use in mounting fragile parts relative to each other by first supporting the parts in the mold cavity and then injecting a molding compound into the cavity. The mold is constructed and arranged with resilient inserts selectively located in the metalic mold wall such that the fragile parts are engaged by the inserts, and not by the metal mold. Thus, dimensional tolerances and the forces exerted on the parts during molding are accommodated and the parts are not fractured during molding.

The present invention finds particular utility in the manufacture of magnetic recording heads where an edge surface of a flat ceramic card carries the head gaps, and a flat portion of the card carries associated electronic components which are connected to the head gaps by small wires or other form on conductor. One or more of these ceramic cards are positioned in the cavity mold such that the edge of the cards which carry the head gaps engages and is protected by a resilient insert. The mold also includes resilient inserts which isolate the electronic components from the mold cavity and deform to allow the electrical conductors to run between the head gaps and the electronic components. Subsequent molding is effective to mount the cards in a desired shape plastic part, without coating the head gaps with plastic and without encapsulating the electronic components in plastic.

By way of example, the above-described ceramic card portion of the recording head may be constructed as described in the co-pending U.S. Pat. application of John W. Wenner, Ser. No. 887,147, filed Dec. 22, 1969, commonly assigned, now U.S. Pat. No. 3,621,153.

The foregoing and other features and advantages of the invention will be apparent from the following more particular description of a preferred embodiment of the invention, as illustrated in the accompanying drawings.

DESCRIPTION OF THE PREFERRED EMBODIMENT

Figure 1:
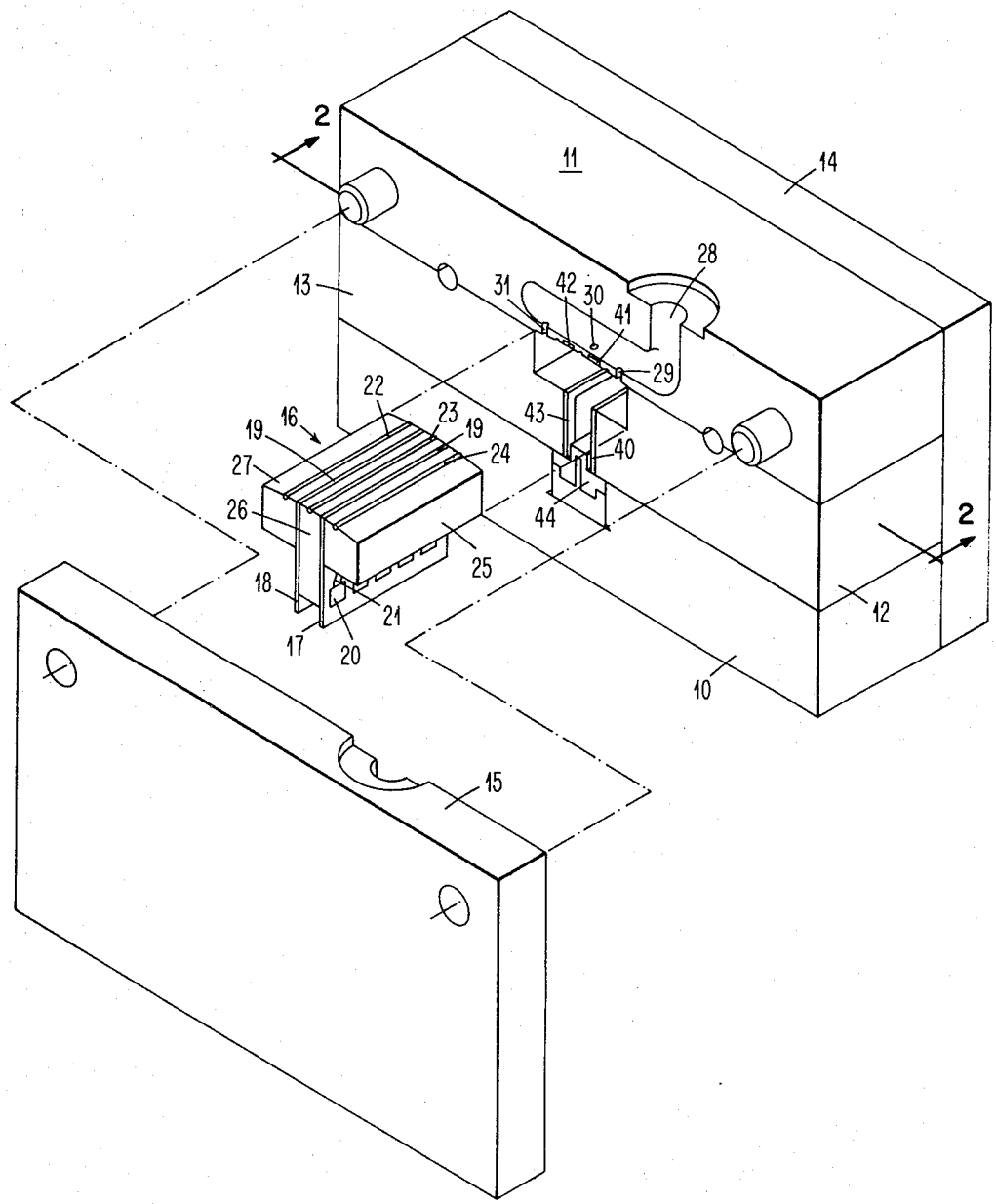
FIG. 1 is a partial exploded view of a cavity mold embodying the present invention, showing a finished magnetic recording head, displaced from the mold cavity.

Referring to FIG. 1, the major portion of a cavity mold embodying the present invention is formed of rigid metal members, specifically, bottom plate 10, top plate 11, end plates 12 and 13, and side plates 14 and 15. Side plate 14 is shown in mating relation with other members of the cavity mold, whereas side plate 15 is displaced to show the mold cavity formed within the mold. Also, a finished part, in this instance magnetic recording head 16, is shown displaced from the mold cavity.

Recording head 16 includes a pair of ceramic cards 17 and 18. Each of these cards includes an upper edge 19 which supports a plurality of magnetic transducing gaps or heads (not shown), as more completely described in the above-mentioned co-pending patent application of John W. Wenner. Additionally, each of these ceramic cards supports a plurality of electronic components 20 which are spaced from edge 19 and which are connected to the head gaps by means of electrical conductors 21.

Figure 2:
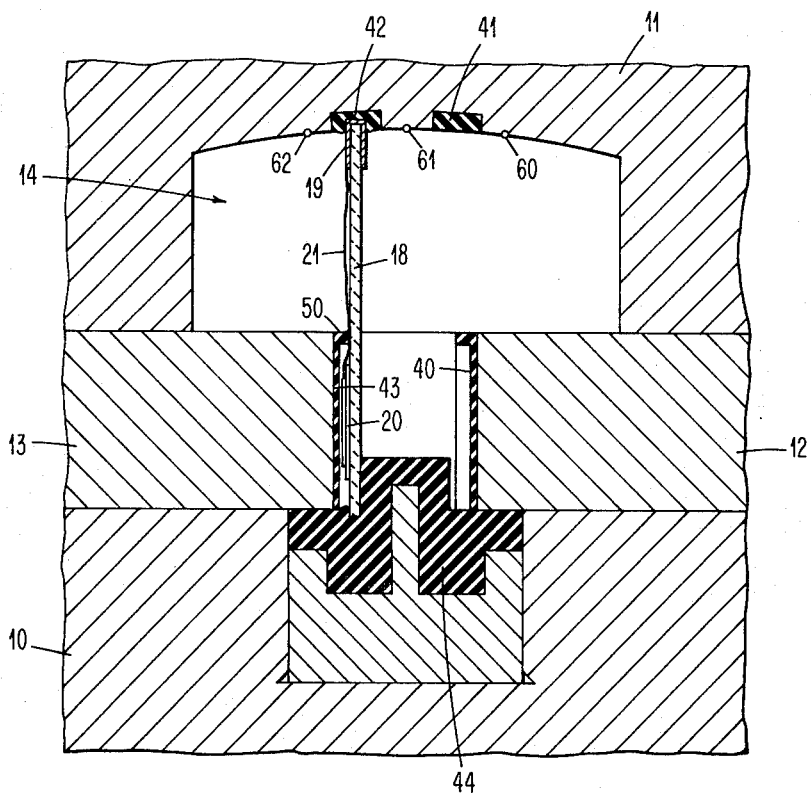
FIG. 2 is a section view of the mold of FIG. 1, showing a single card as it is resiliently held in place within the mold cavity prior to injection of molding material.

Referring to FIG. 2, card 18 is shown resiliently held in place within the mold cavity prior to the injection of molding material. In this figure, the relationship of electronic components 20, conductors 21 and edge 19 of the card is more clearly shown.

Recording head 16 additionally includes three ceramic rods 22, 23 and 24 which are adapted to support moving magnetic tape in transducing relationship to the gaps mounted on edge 19 of the cards 17 and 18. Prior to molding, rods 22—24 are supported in the mold cavity by means of small openings found in side plates 14 and 15, the openings 60—62 in plate 14 being seen in FIG. 2. The functional portions of head 16, as above described, are supported in cooperative relationship by means of molded plastic portions 25, 26 and 27 of head 16.

Top plate 11 of the cavity mold includes injection channel 28 which leads to three small channels 29, 30 and 31. These small channels provide the means by which molding material is injected into the cavity mold to form the portions 25, 26 and 27 respectively of head 16.

Referring now to FIG. 2, it can be seen that the mold cavity is defined by alternate surfaces of rigid metal and resilient, rubber-like inserts. The rubber inserts are identified by reference numerals 40—44. Preferably, the rubber inserts are vulcanized onto the underlying metal surface so as to become an integral part of the generally metal mold. Inserts 41 and 42 and inserts 40 and 43 have identical shapes.

In FIG. 2, card 18 is resiliently supported at a fixed position within the mold cavity. Card 17 is not shown in FIG. 2, so that a comparison can be made between rubber inserts 40, 41 and 44 as they appear without a card mounted within the cavity, and rubber inserts 42, 43 and 44 as they appear with a card mounted in position to deform these inserts. The edge 19 of card 18, which mounts the head gaps, is buried within rubber insert 42 and is thus protected from molding compound during the molding process. Rubber insert 44 is diametrically opposite to insert 42 and supports the bottom edge of card 18. Insert 44 is likewise deformed when the card is placed within the mold cavity. Furthermore, rubber insert 43 is deformed to form a pocket surrounding electronic components 20. The upper edge 50 of this insert deforms to allow conductor 21 to run into the mold cavity, to be encapsulated within the portion 27 of head 16.

Figure 3:
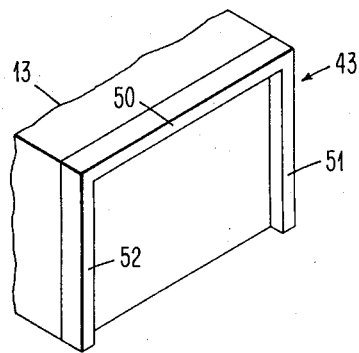
FIG. 3 shows the shape of one of the resilient inserts which forms a pocket about that side portion of the ceramic card which supports electronic circuit components.

FIG. 3 shows a front view of rubber insert 43, and more clearly shows that this insert includes the resilient raised edge 50 which is formed to two raised edges 51 and 52, these edges cooperating with a portion of rubber insert 44 to form a protective pocket for electronic components 20.

Thus, it can be seen hat the unique cavity mold of the present invention not only protects selected portions of card 18 during the molding process, but also accommodates slight dimensional variations which occur from one card to the other, to thus facilitate the use of the cavity mold to both selectively protect certain portions of the card from the molding compound and to likewise prevent fracturing of the card due to stresses created by clamping the card within the mold or due to forces placed upon the card during the molding process.

While the invention has been particularly shown and described with reference to a preferred embodiment thereof, it will be understood by those skilled in the art that various changes in form and details may be made therein without departing from the spirit and scope of the invention.

What is claimed is:

1. A cavity mold for use in encapsulating a fragile magnetic head member in a thermo-setting material, the head member having an edge which supports a magnetic cap, electronic components spaced from the gap and circuit means connecting the gap to the electronic components, the mold comprising;
    a rigid mold partially defining a cavity adapted to hold the head member at a given position within the cavity,
    a first resilient member mounted in a first wall portion of said mold to engage the magnetic gap of the head member,
    a second resilient member mounted in an opposite second wall portion of said mold to engage an opposite portion of the head member, said first and second resilient members engaging the head member to resiliently hold the same in the given position within the mold, said resilient holding accommodating dimensional variation in the head member and allowing movement thereof during molding, and
    a third resilient member mounted in a third wall portion of said mold to engage the head member adjacent the electronic components and to form a cavity which covers the electronic components and isolates the same from the mold cavity, said third resilient member deforming sufficiently to allow the circuit means to extend through the mold cavity to the magnetic gap.

2. Apparatus for use in molding a read/write magnetic head, comprising;
    a pair of fragile cards individually carrying magnetic transducing gaps on like edges thereof, electronic components on a side surface thereof, and circuit conductors interconnecting each card's gaps and electronic components,
    a mold adapted to receive said cards,
    first resilient insert means positioned at a selected surface of said mold,
    a second resilient insert positioned at a diametrically opposed surface of said mold,
    said first and second resilient inserts being constructed and arranged to hold said cards in parallel spaced relationship during molding, said first insert means covering said gaps to prevent the deposit of a molding compound thereon, and
    third and fourth resilient inserts positioned at selected surfaces of said mold to form protective pockets which cover said electronic components and prevent the deposit of molding compound thereon, said third and fourth inserts deforming to allow the passage of said circuit conductors through the mold cavity to said gaps.

3. Apparatus as defined in claim 2 wherein said mold is metallic and wherein said plurality of inserts are formed of a rubber-like material which is bonded to the metal mold to complete the definition of the mold cavity, to form a mold cavity whose wall surfaces include both metal and rubber-like material, and wherein said fragile cards are ceramic cards which are held in parallel spaced position, the cards engaging the mold cavity wall only at a surface of rubber-like material.

* * * * *